United States Patent
Kumar et al.

(10) Patent No.: US 9,910,880 B2
(45) Date of Patent: Mar. 6, 2018

(54) SYSTEM AND METHOD FOR MANAGING ENTERPRISE USER GROUP

(71) Applicants: Shishir Kumar, Patna (IN); Jayakumar Panicker, Bangalore (IN)

(72) Inventors: Shishir Kumar, Patna (IN); Jayakumar Panicker, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 450 days.

(21) Appl. No.: 14/477,972

(22) Filed: Sep. 5, 2014

(65) Prior Publication Data

US 2016/0019250 A1 Jan. 21, 2016

(30) Foreign Application Priority Data

Jul. 16, 2014 (IN) .............................. 3495/CHE/2014

(51) Int. Cl.
*G06F 17/30* (2006.01)

(52) U.S. Cl.
CPC .. *G06F 17/30342* (2013.01); *G06F 17/30598* (2013.01)

(58) Field of Classification Search
CPC ......... G06F 17/30342; G06F 17/30598; G06F 17/30722; G06F 17/30705; G06F 17/30699
See application file for complete search history.

(56) References Cited

U.S. PATENT DOCUMENTS

| | | | |
|---|---|---|---|
| 8,438,184 B1 * | 5/2013 | Wang | ..................... H04L 67/02 707/780 |
| 8,655,882 B2 | 2/2014 | Kretz et al. | |
| 8,671,114 B2 | 3/2014 | Fischer | |
| 8,671,246 B2 | 3/2014 | Toyoshima et al. | |
| 8,671,396 B2 | 3/2014 | Wu et al. | |
| 2003/0126137 A1 * | 7/2003 | McFadden | ........ G06F 17/30604 |
| 2006/0259470 A1 * | 11/2006 | Chandrasekharan | ...................... G06F 17/30569 |
| 2008/0201280 A1 | 8/2008 | Martin et al. | |
| 2012/0226560 A1 * | 9/2012 | Chang | .................... G06Q 30/02 705/14.66 |

(Continued)

FOREIGN PATENT DOCUMENTS

EP 1 622 328 2/2006

OTHER PUBLICATIONS

European Search Report from the European Patent Office in counterpart European Application No. 16175157.5-1958. 5 pages, dated Dec. 3. 2015.

(Continued)

*Primary Examiner* — Alexander Khong
(74) *Attorney, Agent, or Firm* — Finnegan, Henderson, Farabow, Garrett & Dunner, LLP

(57) ABSTRACT

According to an exemplary embodiment, a method for generating an enterprise user group is provided. The method may include receiving a set of attributes for an enterprise network user; receiving one or more enterprise group member identification rules including a similarity distance threshold and a set of target attributes; calculating, using a hardware processor, a similarity assessment score based on the set of target attributes and the set of attributes; and determining, using the hardware processor, whether the enterprise network user is an enterprise group member based on the similarity assessment score and the similarity distance threshold.

18 Claims, 5 Drawing Sheets

(56) References Cited

U.S. PATENT DOCUMENTS

2013/0254680 A1* 9/2013 Buhr .................. A63F 13/12
                                                         715/753
2014/0012870 A1   1/2014 Wark
2015/0039611 A1* 2/2015 Deshpande ....... G06F 17/30598
                                                         707/737

OTHER PUBLICATIONS

Information on Search Strategy—Pilot Phase from the European Patent Office in counterpart European No. 15175157 (Dec. 3, 2015).

* cited by examiner

SYSTEM AND METHOD FOR MANAGING ENTERPRISE USER GROUP

PRIORITY CLAIM

This U.S. patent application claims priority under 35 U.S.C. § 119 to Indian Patent Application No. 3495/CHE/2014, filed Jul. 16, 2014, and entitled "SYSTEM AND METHOD FOR MANAGING ENTERPRISE USER GROUP." The aforementioned application is incorporated herein by reference in its entirety.

TECHNICAL FIELD

This disclosure relates generally to user groups in an enterprise network and, more particularly, to systems and methods for managing enterprise user groups using user profiles.

BACKGROUND

Users in the enterprise network often are members of multiple user groups, e.g., email groups, access control groups, enterprise social networks, etc. The process of creating and maintaining these user groups usually requires manual intervention from authorized enterprise personnel. As a result, the user group is not automatically updated when a user's profile is changed, for example, when a user group member no longer meets the criteria of a user group or when a user becomes qualified to be a member of the user group. The required manual intervention for creating and maintaining the enterprise user groups also renders the process error-prone and time consuming.

The selection criteria for enterprise user group members often includes multiple requirements, and sometimes complex scenarios (e.g., a number of AND/OR operations could be involved). Frequently, multiple personnel are involved in the process of selecting users in the group, and each personnel may have different opinions on the user selection, introducing subjectivity in the user group creation process. This leads to inconsistency and variation in the user profiles of the enterprise user group members, which adversely affects the objective of creating the user groups.

SUMMARY

In one embodiment, a method for generating an enterprise user group is disclosed, comprising: receiving a set of attributes for an enterprise network user; receiving one or more enterprise group member identification rules including a similarity distance threshold and a set of target attributes; calculating, using a hardware processor, a similarity assessment score based on the set of target attributes and the set of attributes; and determining, using the hardware processor, whether the enterprise network user is an enterprise group member based on the similarity assessment score and the similarity distance threshold.

In one embodiment, a system for generating an enterprise user group is disclosed, comprising: one or more hardware processors; and a memory storing instructions that, when executed by the one or more hardware processors, cause the one or more hardware processors to perform operations including: receiving a set of attributes for an enterprise network user; receiving one or more enterprise group member identification rules including a similarity distance threshold and a set of target attributes; calculating, using the one or more hardware processors, a similarity assessment score based on the set of target attributes and the set of attributes; and determining, using the one or more hardware processors, whether the enterprise network user is an enterprise group member based on the similarity assessment score and the similarity distance threshold.

In one embodiment, a non-transitory computer-readable medium is disclosed, storing instructions for generating an enterprise user group that when executed by a hardware processor, cause the hardware processor to perform operations including: receiving a set of attributes for an enterprise network user; receiving one or more enterprise group member identification rules including a similarity distance threshold and a set of target attributes; calculating, using the hardware processor, a similarity assessment score based on the set of target attributes and the set of attributes; and determining, using the hardware processor, whether the enterprise network user is an enterprise group member based on the similarity assessment score and the similarity distance threshold.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. It is intended that the following detailed description be considered as exemplary only, with the true scope and spirit being indicated by the following claims.

Figure 1:
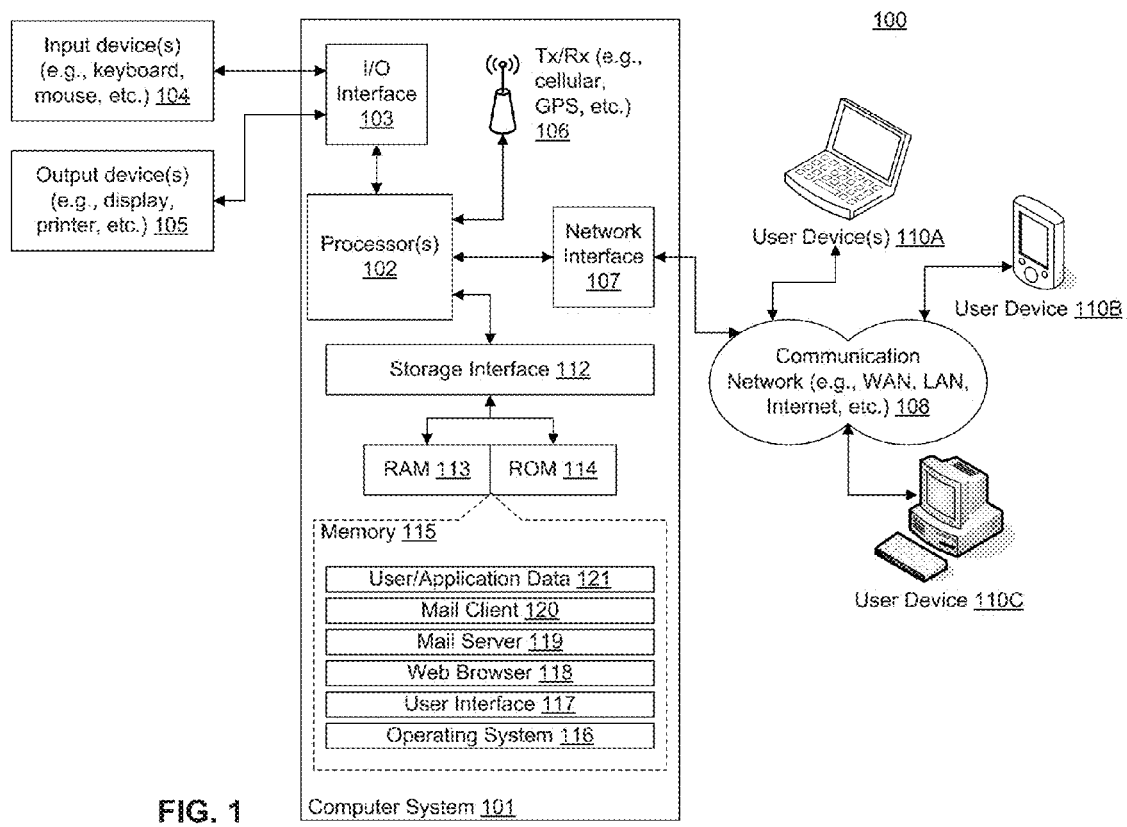
FIG. 1 is a block diagram of an exemplary enterprise network in which embodiments consistent with the present disclosure may be implemented.

FIG. 1 is a block diagram of an exemplary enterprise network 100 in which embodiments consistent with the present disclosure may be implemented. Variations of computer system 101 may be used for implementing any of the systems, modules, components, or devices presented in this disclosure, including those discussed below in connection with FIG. 2. Computer system 101 may comprise one or more central processing units ("CPU" or "processor") 102. Processor 102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 102 may be disposed in communication with one or more input/output (I/O) devices via I/O interface 103. I/O interface 103 may employ communication protocols/methods such as, without limitation, audio, analog, digital, monoaural. RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 103, computer system 101 may communicate with one or more I/O devices. For example, input device 104 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 105 may be a printer, fax machine, video display (e.g., cathode ray tube (CRT), liquid crystal display (LCD), light-emitting diode (LED), plasma, or the like), audio speaker, etc. In some embodiments, a transceiver 106 may be disposed in connection with the processor 102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 102 may be disposed in communication with a communication network 108 via a network interface 107. Network interface 107 may communicate with communication network 108. Network interface 107 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 108 may include, without limitation, a direct interconnection, local area network (LAN), wide area network (WAN), wireless network (e.g., using Wireless Application Protocol), the Internet, etc. Using network interface 107 and communication network 108, computer system 101 may communicate with devices 110A-C (collectively "user devices 110"). These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 101 may itself embody one or more of these devices.

In some embodiments, processor 102 may be disposed in communication with one or more memory devices (e.g., RAM 113, ROM 114, etc.) via a storage interface 112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the various systems shown in FIG. 2.

The memory devices may store a collection of program or database components, including, without limitation, an operating system 116, user interface application 117, web browser 118, mail server 119, mail client 120, user/application data 121 (e.g., any data variables or data records discussed in this disclosure), etc. Operating system 116 may facilitate resource management and operation of computer system 101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 117 may facilitate display, execution, interaction, manipulation, or operation of program components through textual or graphical facilities. For example, user interfaces may provide computer interaction interface elements on a display system operatively connected to computer system 101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 101 may implement a web browser 118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 101 may implement a mail server 119 stored program component. Mail server 119 may be an Internet mail server such as Microsoft Exchange, or the like. Mail server 119 may utilize facilities such as ASP, ActiveX, ANSI C++/C#, Microsoft .NET, CGI scripts, Java, JavaScript, PERL, PHP, Python, WebObjects, etc. Mail server 119 may utilize communication protocols such as internet message access protocol (IMAP), messaging application programming interface (MAPI), Microsoft Exchange, post office protocol (POP), simple mail transfer protocol (SMTP), or the like. In some embodiments, computer system 101 may implement a mail client 120 stored program component. Mail client 120 may be a mail viewing application, such as Apple Mail, Microsoft Entourage, Microsoft Outlook, Mozilla Thunderbird, etc.

In some embodiments, computer system 101 may store user/application data 121, such as the data, variables, records, etc. (e.g., record of transactions, response objects, response chunks) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for managing user groups in an enterprise computing environment. The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
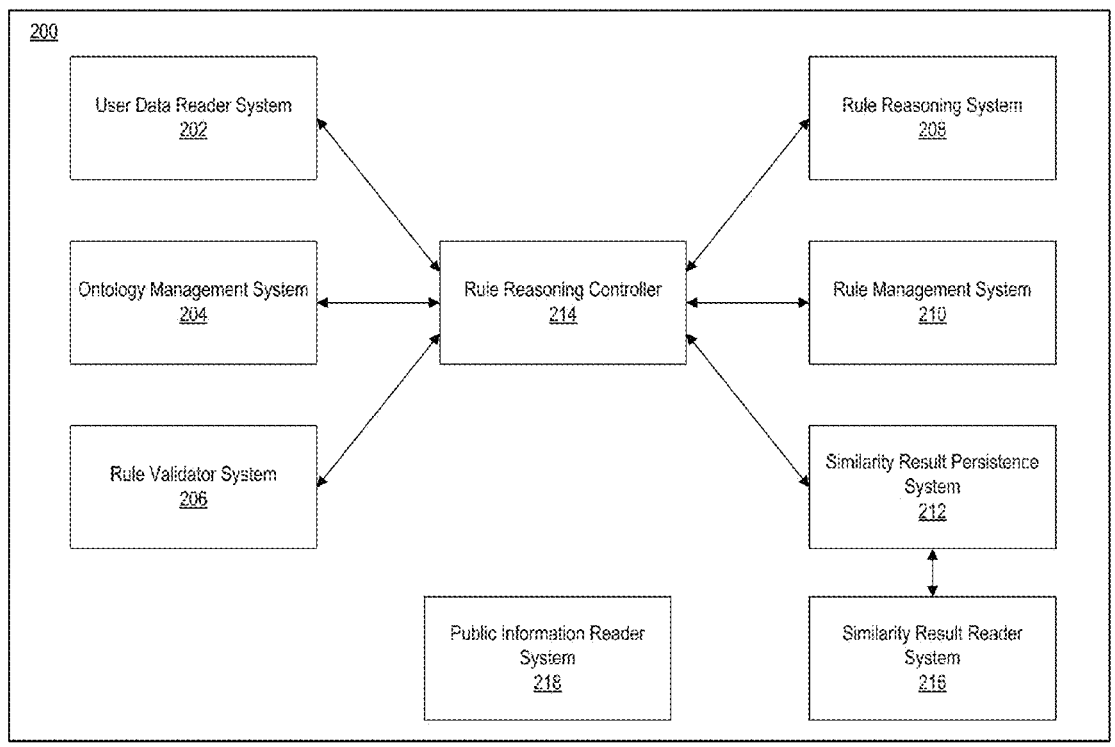
FIG. 2 is an exemplary functional block diagram of an enterprise user group management system, according to some embodiments of the present disclosure.

FIG. 2 is an exemplary functional block diagram of an enterprise user group management system 200, according to some embodiments of the present disclosure. With reference to FIG. 2, in some embodiments, enterprise user group management system 200 may include user data reader system 202, ontology management system 204, rule validator system 206, rule reasoning system 208, rule management system 210, similarity result persistence system 212, rule reasoning controller 214, similarity result reader system 216, and public information reader system 218. As described above, enterprise user group management system 200 may be implemented by, for example, computer system 101.

User data reader system 202 may be configured to read user data stored in an enterprise computer system, such as user profile information including name, identification number, title, department, years of employment, etc. In some embodiments, the user data may be stored in a Resource Description Framework (RDF) format. For example, the user data may be saved in a persistent RDF store or a virtual RDF store. The user data may be stored in a memory of the enterprise computer system, such as memory 115. In some embodiments, user data reader system 202 may be configured to retrieve all user data in the system upon receiving a request. User data reader system 202 may also be configured to receive a request that includes certain user selection criteria, for example, department identification number, user identification number, etc., and retrieve user data associated with certain users that satisfy the selection criteria.

Ontology management system 204 may be configured to manage, for example, create, update, read, or delete, enterprise network domain ontologies. For example, the ontology may contain information about various user groups, hierarchical relationships among the user groups, user attributes, etc. Enterprise network domain ontologies can be used to present a knowledge base for a particular business or industry and to describe business concepts and relationships, such as business classes, roles and the relationship between both.

Rule management system 210 may be configured to manage, for example, create, update, read, or delete, enterprise group member identification rules associated with the various user groups. Rule management system 210 may be configured to manage multiple rules associated with different user groups. For example, the rules may define a set of target attributes associated with a user group, define business logics for comparing user attributers against the target attributes, and/or assign similarity distance thresholds. The target attributes may be presented in the form of a template user profile that includes values of the target user attributes for a user group. The values of the target user attributes may be set as a single value or a range of values. The business logics for comparing user attributers against the target attributes may include a method based on equality, string distance, or a custom method that takes into account of synonyms of the target attributes, etc. The similarity distance thresholds included in the rules may define a threshold value for a user to be considered a member of a user group. For each user group, one or more member identification rules may be defined.

Rule management system 210 may be configured to update the rules when selection criteria for members of a user group changes. For example, when a target attribute is no longer relevant to the user group, rule management system 210 may be configured to remove the specific target user attribute in the rules. For another example, when the selection criteria for members of a user group is intended to be loosened, the similarity distance threshold may be reduced to a lower value such that more users may be included in the user group.

Rule validator system 206 may be configured to determine the validity of the enterprise group member identification rules. In some embodiments, rule validator system 206 may validate the consistency of the rules based on the enterprise network domain ontology. Rule validator system 206 may check the target attributes and/or the similarity distance thresholds defined in the rules and determine whether they are consistent with the ontology. For example, if one of the target attributes does not exist in the ontology, rule validator system 206 may determine that the rule is not valid. For another example, if the target attributes include conflicting entries (e.g., rules identifying employees using customer identification numbers), rule validator system 206 may determine that the rule is not valid.

Rule reasoning system 208 may be configured to apply the enterprise group member identification rules on the user data to identify members of the various user groups. For example, rule reasoning system 208 may be configured to apply the rules on the user data to obtain similarity assessment scores associated with each user, and determine whether the users belong to a user group based on the similarity assessment scores. Rule reasoning system 208 may be configured to apply different rules or the same set of user data.

Similarity result persistence system 212 may be configured to store the information of user groups that a user is associated with in a memory. The information of user groups that a user is associated with may be stored in a RDF store. The stored information may include, for example, the names of the user groups that a user is associated with, the similarity assessment scores associated with each user group, the date and time that the user is identified to be a member of a user group, etc.

Rule reasoning controller 214 may be configured to interact with other systems in the user group management system, for example, user data reader system 202, ontology management system 204, rule validator system 206, rule reasoning system 208, rule management system 210, similarity result persistence system 212, and act as a controller for these systems. For example, rule reasoning controller 214 may be configured to call the appropriate systems to execute the functionalities as discussed above, depending on the stages of the user group management process. For example, rule reasoning controller 214 may be configured to call the rule validator system 206 to validate the rules after receiving rules from rule management system 210. For another example, rule reasoning controller 214 may be configured to call the similarity result persistence system 212 to store the similarity assessment results associated with the user groups after the rule reasoning system 208 applies the enterprise group member identification rules on the user data.

Similarity result reader system 216 may be configured to read information about user group associations for the users after the enterprise group member identification rules is applied to the user data. For example, in response to a request to retrieve information about members of a user group, similarity result reader system 216 may be configured to read the stored information in similarity result persistence system 212 and output information about members of the user group.

Public information reader system 218 may be configured to read publicly accessible information about a user within an enterprise network from a data source. The publicly accessible information may include any data available to the enterprise system related to a user in addition to user profile data, such as web access logs, blogs, etc. In some embodiments, the publicly accessible information may be accessed by using the user's identifier. The publicly accessible information may be accessed only within the enterprise network. The publicly accessible information may be limited by an enterprise policy that sets forth restrictions that certain data may be confidential and not available for retrieval. For example, in response to a request to retrieve publicly accessible information about members of a user group, public information reader system 218 may be configured to read the stored information in various data sources and output the publicly accessible information about members of the user group. In some embodiments, public information reader system 218 may be configured to produce user data for user group generation and/or maintenance. Public information reader system 218 may also be configured to output the publicly accessible information about members of a user group in response to receiving a request that identifies the user group. Public information reader system 218 may also be configured to output the publicly accessible information about a particular user in response to receiving a request that identifies the user by a user identifier.

Figure 3:
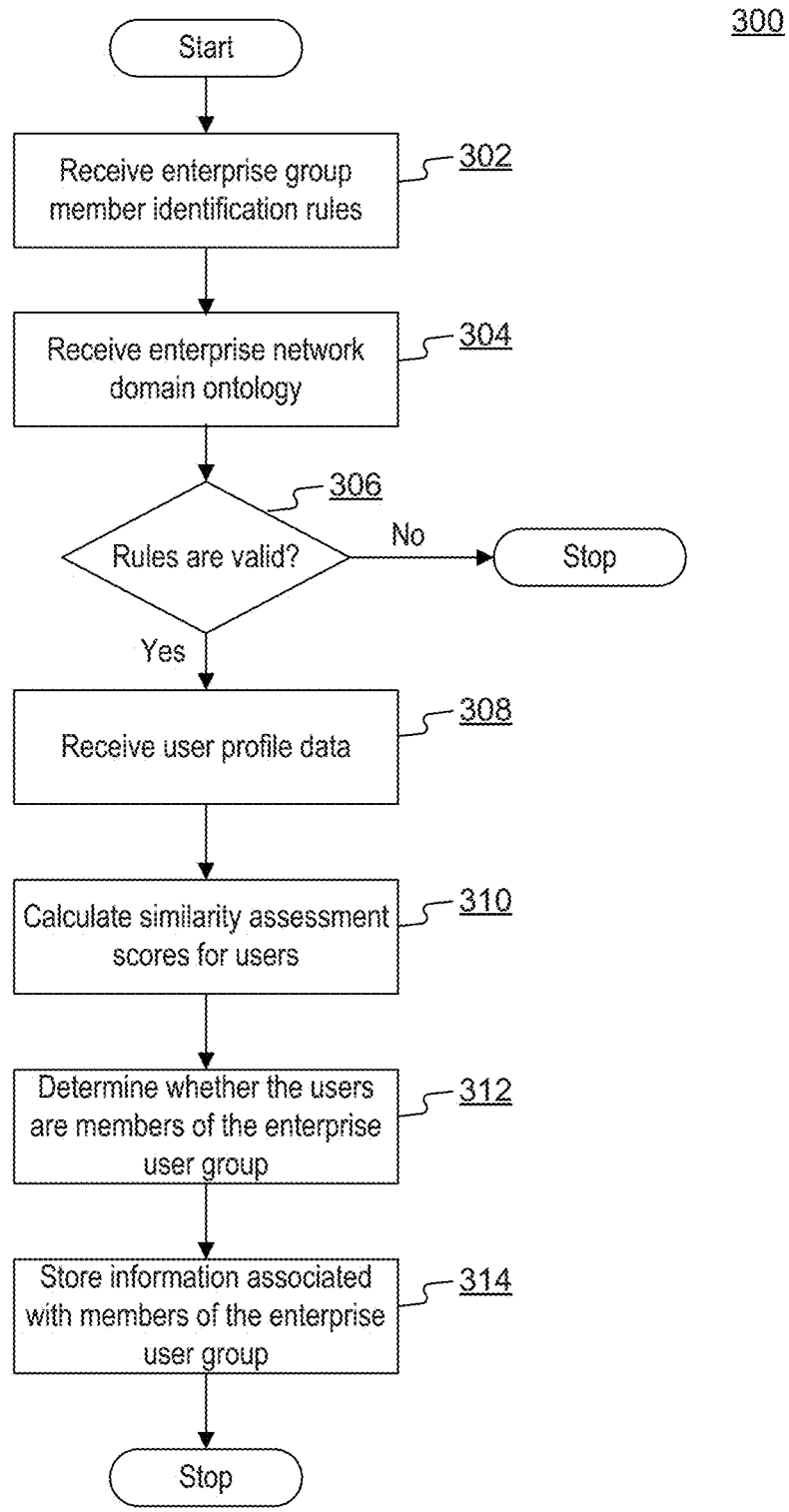
FIG. 3 is a flowchart of an exemplary enterprise user group generation process, consistent with some embodiments of the present disclosure.

FIG. 3 is a flowchart of an exemplary enterprise user group generation process 300, consistent with some embodiments of the present disclosure. The enterprise user group generation process 300 may be implemented by a computer system, e.g., enterprise user group management system 200. At step 302, the enterprise user group generation process may receive enterprise group member identification rules. For example, the enterprise user group generation process may load the rules from rule management system 210. The rules may include a set of target attributes for an enterprise user group. The target attributes may include target values of one or more attributes of user profile, for example, department associated with the user, location of the user, position of the user, years of employment of the user, etc. The rules may also include a similarity distance threshold that is used to identify members of the user group. In some embodiments, the rules may also define a logic for similarity calculation between the set of target attributes and the attributes of the users. For example, the logic may include an equality method, a string distance method, and/or a custom method, for calculating a similarity assessment score associated with the user. One or more rules may be received from rule management system 210 to identify members of a user group.

At step 304, the enterprise user group generation process may receive enterprise network domain ontology. For example, the enterprise user group generation process may load the ontology from ontology management system 204. The enterprise network domain ontology may contain general information about the enterprise users, attributes associated with the users, and identify hierarchical relationships among the enterprise user groups.

At step 306, the enterprise user group generation process may determine the validity of the enterprise group member identification rules based on the enterprise network domain ontology. For example, the rule validator system 206 may check whether the target attributes defined in the rules are fields existent in user profile data. If one of the target attributes is not a valid field in user profile data, rule validator system 206 may determine that the rule is not valid. The rule validator system 206 may also check whether the values defined in the target attributes such as department identification (ID), level of the group member's position, etc., are valid. For example, if the rule identifies a department ID that is not found in the enterprise network domain ontology, the rule validator system 206 may determine that the rule is not valid. Further, the rule validator system 206 may check whether the target attributes defined in the rules are consistent with each other. If there are conflicting or incompatible entries in the target attributes, the rule validator system 206 may determine that the rule is not valid.

If the rules are determined to be invalid at step 306, the enterprise user group generation process may stop and no further user group generation process is performed. If the rules are determined to be valid at step 306, the enterprise user group generation process may receive user profile data at step 308. For example, the user data reader system 202 may load user profile data from a memory. The user profile data may contain a set of attributes associated with enterprise users, such as user identification number, department ID that the user is associated with, location of the user, etc. In some implementations, if the rules received at step 302 identify a specific group of users, for example, users in a certain department, the user data reader system 202 may load only user profile data of the specific group of users, rather than user profile data of all users in the entire enterprise network.

At step 310, the enterprise user group generation process may calculate the similarity assessment scores for each of the users. In some embodiments, the rule reasoning system 208 may calculate the similarity assessment score by comparing the string distance between the target attributes defined in the rule and the attributes associated with the user. Alternatively, the rule reasoning system 208 may calculate the similarity assessment score by determining whether the target attributes defined in the rule are identical to the attributes associated with the user.

In some embodiments, the rule reasoning system 208 may calculate the similarity assessment score by employing a custom matching algorithm. For example, if the target attributes defines the location of the user as in the "USA", the rule reasoning system 208 may check the user's location and determine whether it is within the territory of USA. For instance, if a user's location is identified as New York, the rule reasoning system 208 may determine that the user attribute matches with the target attribute of the user group, and set the similarity assessment score for the user correspondingly. On the other hand, if a user's location is identified as London, the rule reasoning system 208 may determine that the user attribute does not match with the target attribute of the user group, and set the similarity assessment score for the user correspondingly.

In some embodiments, the rule reasoning system 208 may take into account the synonyms and/or acronyms when calculating the similarity assessment score. For example, if the target attributes defines the position of the user as "General Manager", the rule reasoning system 208 may check the user's position and determine that the user's attribute matches with the target attribute when the user's position reads either "General Manager" or "GM". For another example, if the target attributes defines the position of the user as "Manager", the rule reasoning system 208 may check the user's position and determine that the user's attribute matches with the target attribute when the user's position reads "Supervisor" or "Director".

At step 312, the enterprise user group generation process may determine whether the users are members of the enterprise user group based on the calculated similarity assessment scores and the similarity distance threshold defined in the rules. For example, if the similarity assessment score associated with a user is greater than or equal to the similarity distance threshold, the rule reasoning system 208 may determine that the user is a member of the enterprise user group. On the other hand, if the similarity assessment score associated with a user is less than the similarity distance threshold, the rule reasoning system 208 may determine that the user is not a member of the enterprise user group.

At step 314, the enterprise user group generation process may store the information associated with members of the enterprise user group, such as the user similarity data obtained at step 312, in the similarity result persistence system 212. For example, the similarity result persistence system 212 may store the user identifiers of the members of the enterprise user group and the similarity assessment scores associated with the members of the enterprise user group. The similarity result persistence system 212 may output the user identifiers of the members of the enterprise user group in response to a user request. The information associated with members of the enterprise user group may be stored in a RDF format.

The enterprise user group generation process 300 may be executed to generate an enterprise user group as discussed above. Additionally, the enterprise user group generation process 300 may be executed to maintain or update the enterprise user group. For example, the user group generation process 300 may be called manually or triggered automatically when the user profile data has been changed in order to produce updated information associated with members of the enterprise user group. Alternatively, the user group generation process 300 may be configured to run periodically at a pre-defined time. As the user group generation process 300 is executed periodically, the user group generation process 300 is able to take account of the changes of user profile data and produce updated information associated with members of the enterprise user group. Furthermore, the enterprise user group generation process 300 may be executed to generate different enterprise user groups based on different enterprise group member identification rules.

Figure 4:
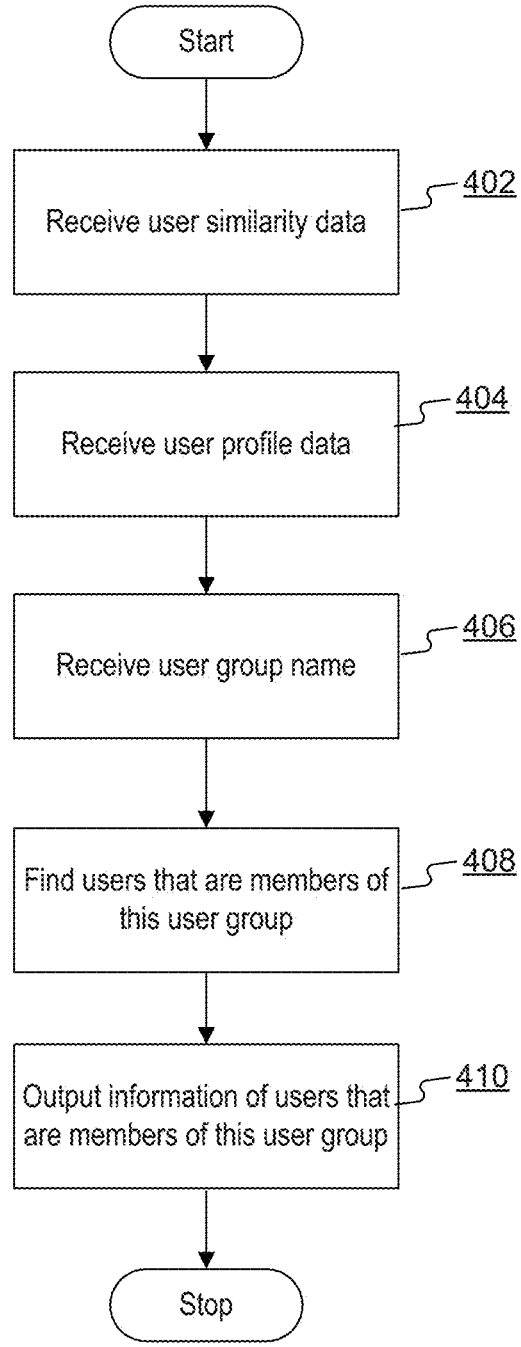
FIG. 4 is a flowchart of an exemplary process of accessing enterprise user groups, consistent with some embodiments of the present disclosure.

FIG. 4 is a flowchart of an exemplary process 400 of accessing enterprise user groups, consistent with some embodiments of the present disclosure. After a user group is generated, for example, by process 300, information associated with members of the user groups may be accessed and outputted upon a user request. In the exemplary process 400, information of members of a certain user group may be found and outputted. The exemplary process 400 may be implemented by a computer system, for example, by the enterprise user group management system 200.

As shown in FIG. 4, the process may begin by receiving user similarity data at step 402. For example, the similarity result reader system 216 may load the user similarity data from similarity result persistence system 212. The user similarity data may include information associated with members of various enterprise user groups. At step 404, user profile data may be received. For example, the user data reader system 202 may load the user profile data from the data source, such as a database of user data. The user profile data may include a set of attributes associated with users of the enterprise network.

At step 406, the process may receive an enterprise user group name as a user input via a user interface. The enterprise user group name may identify a particular user group associated with which information is requested. In some embodiments, if the enterprise user group name is not existent in the computer system, the process may output an error message and/or prompt the user the re-enter the enterprise user group name via the user interface. In some embodiments, if the enterprise user group name is not existent in the computer system, the process may output one or more alternative enterprise user group names that are similar to the received enterprise user group name, and prompt the user to select one of them via the user interface.

At step 408, the process may proceed to find users that are members of this user group based on the received user group name and the user similarity data. For example, the rule reasoning controller 214 may search the user similarity data using the received user group name. In some embodiments, the rule reasoning controller 214 may also search the user similarity data using one or more alternative enterprise user group names that are similar to the received enterprise user group name.

At step 410, the process may output information of users that are members of this enterprise user group. For example, the rule reasoning controller 214 may output user identifiers of members of this user group, and/or names of members of this user group. In some embodiments, rule reasoning controller 214 may also output user profile data of members of this user group, such as departments, positions, and/or contact information associated with members of this user group.

Figure 5:
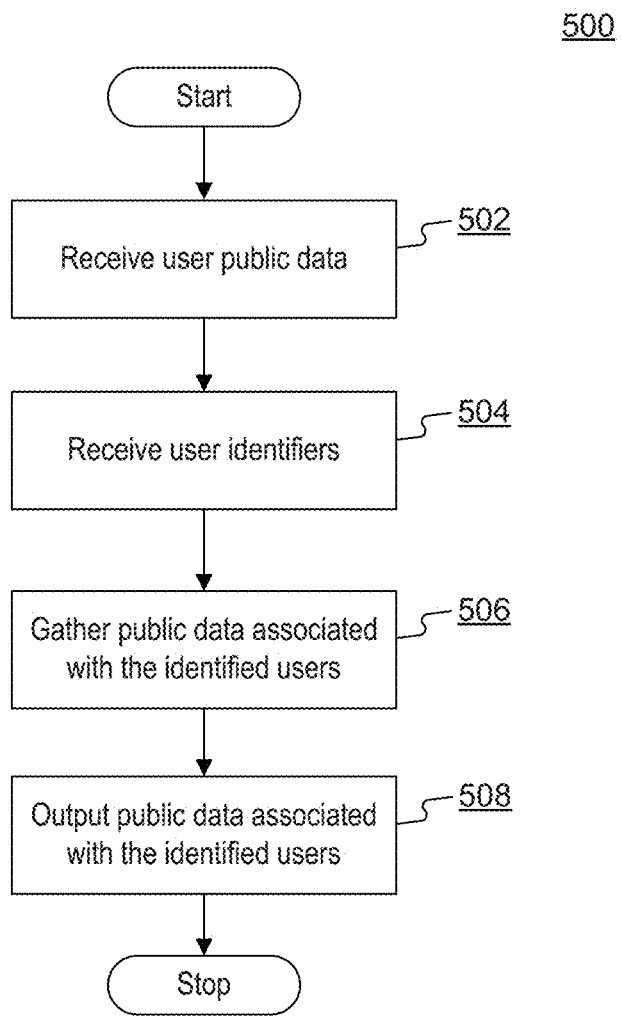
FIG. 5 is a flowchart of an exemplary process of accessing enterprise user public data, consistent with some embodiments of the present disclosure.

FIG. 5 is a flowchart of an exemplary process 500 of accessing enterprise user public data, consistent with some embodiments of the present disclosure. In the exemplary process 500, user public data within the enterprise network may be accessed and outputted. The user public data may include information related to user activities in the enterprise network. For example, the user public data may include web access logs associated with the enterprise users, blogs associated with the enterprise users, projects the enterprise user participated in, and/or the like. The exemplary process 500 may be implemented by a computer system, for example, by the enterprise user group management system 200.

As shown in FIG. 5, the process may begin by receiving user public data at step 502. For example, the public information reader system 218 may load the user public data from various data sources. At step 504, the process may receive user identifiers as a user input via a user interface. For example, the user identifies may identify the users associated with which user public data is requested. The user identifiers may include user identification numbers, names of the users, and/or an enterprise user group name. If the user identifiers include an enterprise user group name, the process may retrieve information of the users that are members of the enterprise by using the process discussed above in connection with FIG. 4.

At step 506, the process may gather public data associated with the users that are identified in step 504. For example, the rule reasoning controller 214 may search the user public data received in step 502 using the received user identifiers. In some embodiments, the rule reasoning controller 214 may first convert the received user identifiers to a format that is consistent with the identifiers in the user public data, and then search the user public data received in step 502 using the converted user identifiers.

At step 508, the process may output public data of the users that are identified in step 504 via a user interface. In some embodiments, the rule reasoning controller 214 may first output a portion of the public data associated with the identified users. Upon receiving further user request, the rule reasoning controller 214 may output the entire public data associated with the identified users.

It should be understood that the user public data may also be used in enterprise user group generation process 300 to generate enterprise user groups. For example, the enterprise group member identification rules may define one or more target attributes that are associated with user public data. Similarity assessment scores may be calculated based on the similarity between the target attributes and the user public data. In other words, the user data used to generate enterprise user group may not be limited to user profile data which includes a set of pre-defined user attributes. The user data used to generate enterprise user group may also include user public data generated based on activities the users conducted in the enterprise network.

The specification has described systems and methods for managing enterprise user groups. The illustrated steps are set out to explain the exemplary embodiments shown, and it should be anticipated that ongoing technological development will change the manner in which particular functions are performed. These examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating an enterprise user group, comprising:

receiving, by a computer system, a set of attributes for an enterprise network user;

receiving, by the computer system, one or more enterprise group member identification rules including a similarity distance threshold and a set of target attributes;

receiving an enterprise network domain ontology including hierarchical relationships among a plurality of enterprise groups;

determining that the one or more enterprise group member identification rules are valid based on the enterprise network domain ontology;

determining, using a hardware processor, a change in selection criteria for enterprise group members of the enterprise user group, wherein the similarity distance threshold is updated on determination of the change and a target attribute from the set of target attributes is removed from the set of target attributes to create an updated set of attributes when the target attribute is not relevant to the enterprise user group;

calculating, using the hardware processor, a similarity assessment score based on the updated set of target attributes and the set of attributes; and determining, using the hardware processor, whether the enterprise network user is an enterprise group member based on the similarity assessment score and the similarity distance threshold, wherein determining whether the enterprise network user is an enterprise group member comprises:

comparing the similarity assessment score with the similarity distance threshold; and determining that the enterprise network user is an enterprise group member if the similarity assessment score is greater than or equal to the similarity distance threshold.

2. The method of claim 1, further comprising: storing user identifiers associated with enterprise group members; and outputting the user identifiers after receiving a user request.

3. The method of claim 2, further comprising: receiving data associated with the enterprise group members; storing the data associated with the enterprise group members; and outputting the data associated with the enterprise group members after receiving the user request.

4. The method of claim 1, wherein calculating the similarity assessment score comprises comparing string distance between one or more of the set of attributes and one or more of the set of target attributes.

5. The method of claim 1, wherein calculating the similarity assessment score comprises determining whether one or more of the set of attributes are identical to one or more of the set of target attributes.

6. The method of claim 1, wherein calculating the similarity assessment score comprises determining whether one or more of the set of attributes are synonyms of one or more of the set of target attributes.

7. A system for generating an enterprise user group, comprising:
one or more hardware processors; and
a memory storing instructions that, when executed by the one or more hardware processors, cause the one or more hardware processors to perform operations including:
receiving a set of attributes for an enterprise network user;
receiving one or more enterprise group member identification rules including a similarity distance threshold and a set of target attributes;
receiving an enterprise network domain ontology including hierarchical relationships among a plurality of enterprise groups;
determining that the one or more enterprise group member identification rules are valid based on the enterprise network domain ontology;
determining a change in selection criteria for enterprise group members of the enterprise user group, wherein the similarity distance threshold is updated on determination of the change and a target attribute from the set of target attributes is removed from the set of target attributes to create an updated set of attributes when the target attribute is not relevant to the enterprise user group;
calculating, using the one or more hardware processors, a similarity assessment score based on the updated set of target attributes and the set of attributes; and
determining, using the one or more hardware processors, whether the enterprise network user is an enterprise group member based on the similarity assessment score and the similarity distance threshold, wherein determining whether the enterprise network user is an enterprise group member comprises:

comparing the similarity assessment score with the similarity distance threshold; and determining that the enterprise network user is an enterprise group member if the similarity assessment score is greater than or equal to the similarity distance threshold.

8. The system of claim 7, wherein the memory stores instructions that, when executed by the one or more hardware processors, cause the one or more hardware processors to further perform operations including: storing user identifiers associated with enterprise group members; and outputting the user identifiers after receiving a user request.

9. The system of claim 8, wherein the memory stores instructions that, when executed by the one or more hardware processors, cause the one or more hardware processors to further perform operations including: receiving data associated with the enterprise group members; storing the data associated with the enterprise group members; and outputting the data associated with the enterprise group members after receiving the user request.

10. The system of claim 7, wherein calculating the similarity assessment score comprises comparing string distance between one or more of the set of attributes and one or more of the set of target attributes.

11. The system of claim 7, wherein calculating the similarity assessment score comprises determining whether one or more of the set of attributes are identical to one or more of the set of target attributes.

12. The system of claim 7, wherein calculating the similarity assessment score comprises determining whether one or more of the set of attributes are synonyms of one or more of the set of target attributes.

13. A non-transitory computer-readable medium storing instructions for generating an enterprise user group that, when executed by a hardware processor, cause the hardware processor to perform operations including:
receiving a set of attributes for an enterprise network user;
receiving one or more enterprise group member identification rules including a similarity distance threshold and a set of target attributes;
receiving an enterprise network domain ontology including hierarchical relationships among a plurality of enterprise groups;
determining that the one or more enterprise group member identification rules are valid based on the enterprise network domain ontology;
determining a change in selection criteria for enterprise group members of the enterprise user group, wherein the similarity distance threshold is updated on determination of the change and a target attribute from the set of target attributes is removed from the set of target attributes to create an updated set of attributes when the target attribute is not relevant to the enterprise user group;
calculating, using the hardware processor, a similarity assessment score based on the updated set of target attributes and the set of attributes; and
determining, using the hardware processor, whether the enterprise network user is an enterprise group member based on the similarity assessment score and the similarity distance threshold, wherein determining whether the enterprise network user is an enterprise group member comprises:

comparing the similarity assessment score with the similarity distance threshold; and determining that the enterprise network user is an enterprise group member if the similarity assessment score is greater than or equal to the similarity distance threshold.

14. The non-transitory computer-readable medium of claim 13, wherein the non-transitory computer-readable medium stores instructions that, when executed by the hardware processor, cause the hardware processor to further perform operations including: storing user identifiers associated with enterprise group members; and outputting the user identifiers after receiving a user request.

15. The non-transitory computer-readable medium of claim 14, wherein the non-transitory computer-readable medium stores instructions that, when executed by the hardware processor, cause the hardware processor to further perform operations including: receiving data associated with the enterprise group members; storing the data associated with the enterprise group members; and outputting the data associated with the enterprise group members after receiving the user request.

16. The non-transitory computer-readable medium of claim 13, wherein calculating the similarity assessment score comprises comparing string distance between one or more of the set of attributes and one or more of the set of target attributes.

17. The non-transitory computer-readable medium of claim 13, wherein calculating the similarity assessment score comprises determining whether one or more of the set of attributes are identical to one or more of the set of target attributes.

18. The non-transitory computer-readable medium of claim 13, wherein calculating the similarity assessment score comprises determining whether one or more of the set of attributes are synonyms of one or more of the set of target attributes.

* * * * *